US007047204B1

(12) United States Patent
Wood et al.

(10) Patent No.: US 7,047,204 B1
(45) Date of Patent: May 16, 2006

(54) METHOD FOR REDUCING FRAUD IN GOVERNMENT PROGRAMS

(76) Inventors: Richard Glee Wood, 4627 Cashel Cir., Houston, TX (US) 77069; Wesley Jack White, Jr., 6219 Squires Ct., Spring, TX (US) 77389

( * ) Notice: Subject to any disclaimer, the term of this patent is extended or adjusted under 35 U.S.C. 154(b) by 0 days.

(21) Appl. No.: 10/443,382

(22) Filed: May 22, 2003

Related U.S. Application Data

(63) Continuation-in-part of application No. 10/428,213, filed on May 2, 2003, now Pat. No. 6,820,059.

(60) Provisional application No. 60/461,226, filed on Apr. 8, 2003.

(51) Int. Cl.
*G06Q 40/00* (2006.01)

(52) U.S. Cl. ............................................. 705/4

(58) Field of Classification Search .................... 705/1, 705/4, 67, 72; 707/9

See application file for complete search history.

(56) References Cited

U.S. PATENT DOCUMENTS

| 5,559,885 | A  | * | 9/1996  | Drexler et al. ............... 235/380 |
| 5,884,271 | A  | * | 3/1999  | Pitroda ........................... 705/1 |
| 5,984,366 | A  | * | 11/1999 | Priddy ........................... 283/72 |
| 6,012,035 | A  |   | 1/2000  | Freeman ......................... 705/2 |
| 6,163,770 | A  |   | 12/2000 | Gamble .......................... 705/4 |
| 6,208,973 | B1 | * | 3/2001  | Boyer et al. .................... 705/2 |
| 6,898,299 | B1 | * | 5/2005  | Brooks .......................... 382/115 |

(Continued)

FOREIGN PATENT DOCUMENTS

WO    WO 01/04821 A1 *  1/2001

OTHER PUBLICATIONS

Eiland, "A Bill to be Entitled an Act." Acts of the 75th Legislature, Regular Session, 1997.

(Continued)

*Primary Examiner*—Joseph Thomas
*Assistant Examiner*—Christopher L Gilligan
(74) *Attorney, Agent, or Firm*—Buskop Law Group, P.C.; Wendy Buskop

(57) ABSTRACT

Methods for registering individuals with government programs to eliminate fraud are described herein. The method includes registering a first person with a government entity having a governmental program and issuing an individual identification code (IIC) to the first person, entering the individual identification code (IIC) into an electronic retrieval system and obtaining first data on the first person at a first point in time. The first data can include first biometric data, a first personal identification code, a first electronic signature, and combinations thereof. The method further includes linking the first data to the individual identification code (IIC), and reading second data at a second point in time, wherein the second data can include second biometric data, a second personal identification code, a second electronic signature and combinations thereof, of a second person, and wherein the second point of time is later than the first point of time. The method further includes comparing the second data with the first data to form compared data, determining from the compared data whether the second person is the first person to obtain a verified identity, and making a first transmission of the verified identity to the government entity. The first transmission includes the individual identification code (IIC) and a first query for personal information on the first person. The method further includes making a second transmission from the government entity providing the information requested in the first query and making a third transmission providing updated personal information to the government entity.

17 Claims, 3 Drawing Sheets

U.S. PATENT DOCUMENTS

2003/0115459 A1* 6/2003 Monk .......................... 713/168

OTHER PUBLICATIONS

Ogden, "A Bill to be Entitled an Act." Acts of the 78th Legistlature, Regular Session, 2003.

"Texas Senate Special Committee on Prompt Payment of Health Care Providers." Interim Report to the 78th Legislature, Nov. 2002.

Rehnquist, Janet. "Improper Fiscal Year 2002 Medicare Fee-for-Service Payments," Jan. 8, 2003 (A17-02-02202).

* cited by examiner

| Individual Name (502) | Individual SSN (512) | Government Email (522) | Other Phone Numbers (532) |
|---|---|---|---|
| Individual Address (504) | Government Benefit Program Name (514) | Government Social Service Program Administrator (524) | Instructions on How to Contact Government (534) |
| Individual Phone (506) | Government Benefit Program Address (516) | Description of Social Service Benefit Plan (526) | Expiration Date of the Card (536) |
| Individual Fax (508) | Government Phone (518) | Individual Payment Amount (528) | Government Website (538) |
| Individual Email (510) | Government Fax (520) | Individual's Benefit History (530) | Chip to Link to the Government for Information on the Benefit Program (540) |

FIG. 2

METHOD FOR REDUCING FRAUD IN GOVERNMENT PROGRAMS

CROSS-REFERENCE TO RELATED APPLICATIONS

This application is a continuation in part of U.S. patent application Ser. No. 10/428,213 filed May 2, 2003, now U.S. Pat. No. 6,820,059, which claims priority to provisional U.S. Patent Application Ser. No. 60/461,226 filed Apr. 8, 2003 entitled "Method for Reducing Fraud in Government Benefit Programs Using a Smart Card", both of which are incorporated herein by reference.

BACKGROUND

1. Field of Invention

Embodiments of the invention relate to reducing fraud in government healthcare programs that tracks identification, implements security measures, and other information to facilitate the transfer of finds and eliminate fraud in the benefit.

2. Description of Related Art

Providers of benefits from government sponsored healthcare providers have concerns wherein individuals can "double dip" into government sponsored healthcare provider programs getting twice the payment, or service providers could inadvertently "double bill" or inappropriately bill for services rendered.

In addition, problems have existed wherein proper service and goods providers for government healthcare programs have had to wait long periods of time to get paid for their services or goods rendered to the eligible employee. This situation has caused benefit costs to be very high, reducing overall benefits available due to these fraud issues.

A need has long existed for a system wherein the government sponsored healthcare provider advances finds to pay a service or goods provider so that an eligible individual does not have to handle money and the provider is promptly paid.

Therefore, a need exists for a system where the government advances funds to pay for the services of a service or goods provider, and as a result, an eligible person does not have to handle money in order to receive benefits. This need is particularly great for incapacitated individuals, such as those in nursing homes, who are no longer able to handle funds or complicated transactions.

Additionally, a need exists for a method to reduce the magnitude of transaction costs involved in reviewing and adjudicating payment requests to a governmental agency. Such a method would reduce the rate of increase of government benefit costs and/or enable more benefits to be provided to more people. Furthermore, a method is needed to reduce the traditionally high cost of benefits administration, including the review and adjudication of payment requests which results from benefit service or goods providers having to act as "banks" or "credit sources" for individuals eligible for the benefit.

SUMMARY

Embodiments of the invention generally include a method for registering a person with a government program to eliminate fraud. The method includes registering a first person with a first government entity having a government program and issuing an individual identification code (IIC) to the first person and entering the individual identification code (IIC) into an electronic retrieval system. The method further includes obtaining first data at a first point in time on the first person and linking the first data to the individual identification code (IIC), wherein the first data is selected from the group including first biometric data, a first personal identification code (PIN1), a first electronic signature, and combinations thereof. The method further includes reading second data at a second point in time of a second person, wherein the second data is selected from the group including second biometric data, a second personal identification code (PIN2), a second electronic signature and combinations thereof, wherein the second point of time is later than the first point of time.

The method further includes comparing the second data with the first data to form compared data and determining from the compared data whether the second person is the first person to obtain a verified identity. Further, the method includes making a first transmission of the verified identity to the first government entity, wherein the first transmission includes the individual identification code (IIC) and a first query for personal data on the first person. The method additionally includes making a second transmission from the first government entity providing the personal data requested in the first query and making a third transmission providing updated personal data to the first government entity.

BRIEF DESCRIPTION OF THE DRAWINGS

Aspects of the present invention will be described in greater detail with reference to the appended figures.

FIG. 2 illustrates a flowchart of a smart card usable in the invention.

DETAILED DESCRIPTION

Figure 1:
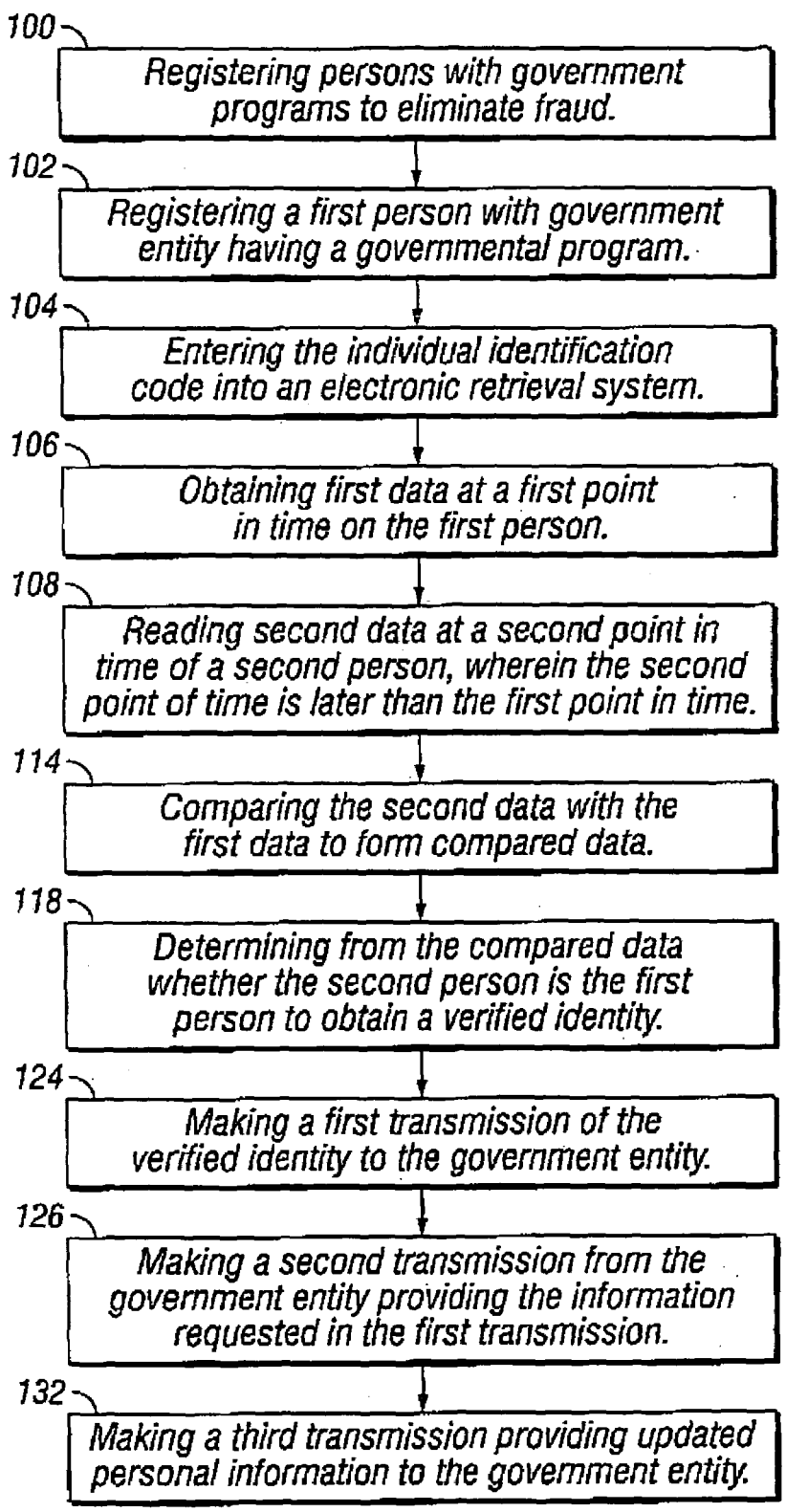
FIG. 1 illustrates a flowchart of the overall method of the invention.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the pertinent art to make and use the inventions, when the information in this patent is combined with available information and technology. Various terms as used herein are defined below. To the extent a term used in a claim is not defined below, it should be given the broadest definition persons in the pertinent art have given that term as reflected in printed publications and issued patents.

Embodiments of the invention include methods for registering a person with a government program to eliminate fraud. The method generally includes registering a first person with a first government entity having a government program and issuing an individual identification code (IIC) to the first person.

The method further includes entering the individual identification code (IIC) into an electronic retrieval system.

Entering the individual identification code (IIC) into an electronic retrieval system aids in subsequent verification of identities. The electronic retrieval system can include a database wherein the personal data is held for comparison purposes. Further, the electronic retrieval system can include a process selected from the group consisting of: an internet query, an e-mail query, a network query, comparative information transfers and combinations thereof.

The method further includes obtaining first data at a first point in time on the first person and linking the first data to the individual identification code (IIC). The first point in time can be the same time as the time of issuance of the individual identification code to the first person or the first data can be obtained at a different time. Preferably, the first data is obtained at the same point in time as the registration of the first person with the government entity.

The first data can include a variety of personal data, such as first biometric data, a first personal identification code (PIN1) and a first electronic signature. The personal data can further include personal data, such as a photographic image of the first person, which can be linked to the individual identification code (IIC). The personal data can further include the person's name, the person's address, the person's phone number, government issued license numbers, such as military ID numbers, passport numbers, and driver's license numbers, the person's social security number, government security clearance codes, government issued status, military status, citizenship information, racial background, country of origin, date of birth, location of birth, height, weight, hair color, voluntary emergency contact person name and voluntary health information, such as a personal health history.

The voluntary health information can include diabetic information, allergic reactions to drugs, blood type, epilepsy required medications, health conditions, required medications and combinations thereof.

The method further includes reading second data at a second point in time of a second person. The second data can include a variety of personal data (similar to the first data), such as second biometric data, a second personal identification code (PIN2) and a second electronic signature. Preferably, the second point of time is later than the first point of time. For example, the second point in time can include a point in time when the second person is having a medical emergency.

The method further includes comparing the second data with the first data to form compared data.

The method further includes determining from the compared data whether the second person is the first person to obtain a verified identity. The determining from the compared data whether the second person is the first person generally includes matching personal data, such as biometrics and the person's social security number.

The method further includes making a first transmission of the verified identity to the first government entity. The first transmission includes the individual identification code (IIC) and a first query for personal data on the first person. The first transmission can be facilitated by an authorized entity registered with the first government entity. The authorized entity can include a police officer, a court, an emergency medical technician, a fireman, military personnel, a department of public safety officer, a disaster recovery team member, a hospital worker, an immigration officer, a customs officer, a physician or federal airport security personnel.

The method can further include making a second query to a second government entity in the first transmission. The second government entity can be a U.S. Passport agency, Immigration and Naturalization Service, Internal Revenue Service, state driver's licensure agencies, state parks, federal parks, federal monuments, voter registration bureaus, social security agencies, military agencies, professional licensure agencies, police departments, drug enforcement agencies, secondary education institutions, state and federal human service agencies and combinations thereof The method further includes making a second transmission from the first government entity providing the personal data requested in the first query. The second transmission can include a tracking number for the first transmission and a statement as to all queries made for the first person.

The method further includes making a third transmission providing updated personal data to the first government entity.

Embodiments of the invention can further include using a smart card to facilitate the first transmission and third transmissions, wherein the smart card is issued by the first government entity and the smart card includes retrieval information. For example, the smart card can be a plastic card with a chip in it or a plastic card with a magnetic strip. The chip or strip can contain information on a person and other related information. It is contemplated that a plastic smart card could be used with a magnetic strip containing key information without requiring a chip or with both a chip and a magnetic strip.

For the chip version of the smart card, the card is first manufactured in a conventional manner, and then the relevant information is downloaded from the computers of the government to the card. For a non-chip version of a smart card, the card manufacturer would be provided information about the person from the government and embed the relevant information in the magnetic strip and then mail or transfer the magnetic strip card to the user.

The smart card can contain information about benefits for which a person is eligible and an identification code, such as a "PIN" or other type of identification such as retinal or biometric identification means.

The smart card is preferably an electronically readable card that can connect to a computer of the government agency, such as via the Internet or telephone line. The card is contemplated to contain information on at least one or more of the following:

a) personal name (example—Richard Wood);
b) personal address (example—2396 Wood Street, Houston, Tex. 77019);
c) personal phone number (example—713-323-5555);
d) personal fax number (example—713-323-5554);
e) personal email address (example—Wood@aol.com);
f) government agency name and/or government administrator name (example—Mary Jones, Supervisor of the Food Stamp Program);
g) government agency address;
h) government phone number (example—281-873-8682);
i) government agency fax number;
j) government agency e-mail;
k) government's website;
l) government claims representative;
m) type of benefit plan or plans;
n) personal benefit number (example—Group 200116289);
o) personal group number or group plan number (example—KLINASD);
p) individual's co-pay amount (example—$25);
q) individual's benefit history;
r) instructions (example—benefits instructions embedded in the card);
s) other phone numbers;
t) issue date or "validity" date;

u) an expiration date or "expiry date";
v) statements as to ownership of the card;
w) statements as to eligibility of the holder as to the rights of the card and the existence of written agreements related to the card; and
x) disclaimers concerning use, misuse, and revocation of the card.

A smart card can be issued to the person and tied or otherwise related to a particular government benefits program of the governmental entity, such as to the food stamp program of the State of Texas. In this situation, the person has an individual identification code (IIC) and the smart card has a smart card identification feature to identify the person, such as through a biometrics device, like a fingerprint reader or a retinal reader.

A service provider or goods provider can use the smart card to determine if the person is the authorized bearer of the card and is eligible for benefits from the government benefit program for which the service or goods provider can be compensated.

The smart card can also be used to determine if a service or goods provider is preauthorized to provide a registered product or registered service under the government benefit program The embodiments described herein advantageously reduce fraud on the government by providing a safe method of pre-authorizing users for benefits prior to rendering the benefit.

When the methods described herein are adapted for use without a smart card, e.g., cardless, the government is able to verify identities of persons without the expense of issuing identification cards, while providing efficient verification.

Further, the embodiments described herein facilitate tracing and tracking activities and movements of persons, insure identity theft reduction, provide positive identity for many situations, emergency situations determine identity quickly, aid for enforcement, fraud reduction, any place positive ID helpful, saves money and time, for example. The embodiments further reduce administrative costs and provide a probable reduction of labor costs.

Embodiments of the invention also advantageously can prevent ineligible users from using services for which they are not authorized.

FIG. 2 shows a smart card that is contemplated as within the scope of the invention. The smart card is an electronically readable card containing personal name (502); personal address (504); personal phone number (506); personal fax number (508); personal email address (510); personal social security number (512); government benefit program name (514); government benefit program address (516); government phone number (518); government fax number (520); government e-mail address (522); government benefit program administrator (524); description of benefit plan (526); optional personal payment amount (528); individual's benefit history (530) (this information can include information on length of time on government programs and types of other programs the person is a participant); other phone numbers (532); instructions on how to contact government (534); expiration date of the card (536); government website (538); a chip to link to the government for information on the benefit program (540); and combinations thereof. Examples of each information type are located earlier in this description.

Figure 3:
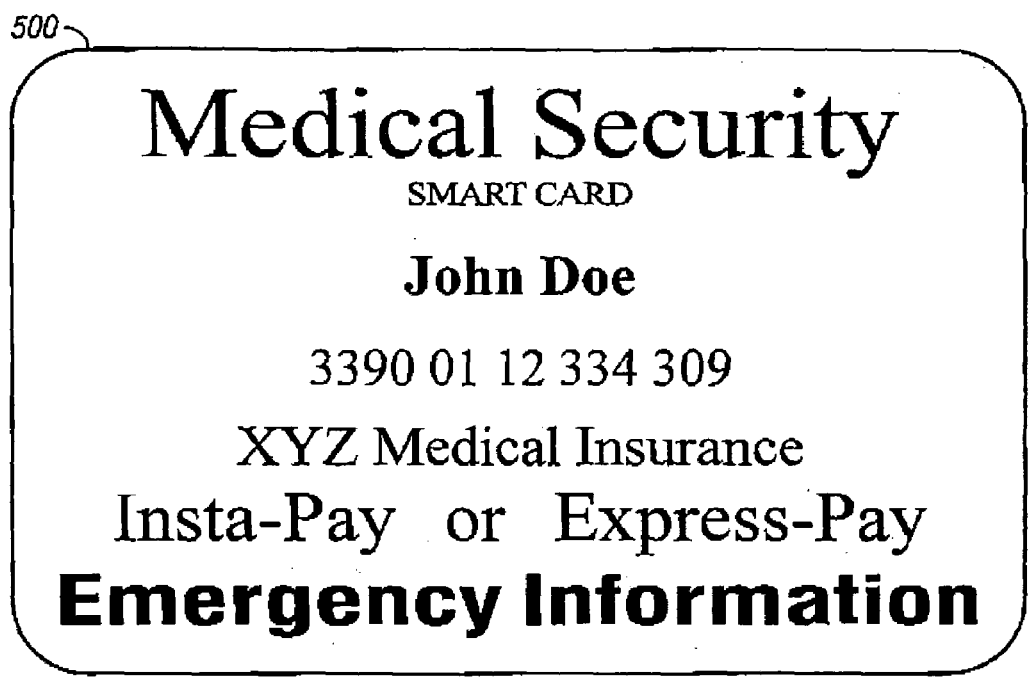
FIG. 3 illustrates a smart card.

FIG. 3 shows an example of a smart card (500).

A preferred embodiment includes a direct transaction between the service provider and the government using the smart card to facilitate the transaction. In an alternative embodiment, the smart card is contemplated to provide aid to third parties intermediaries. Third party intermediaries can include insurance providers, such as insurance companies.

These third party intermediaries can act as a go between the government programs and the individuals receiving the benefit from a government program. Examples of third party intermediaries are School Meal programs, job placement assistance programs, organizations like Meals On Wheels, and other similar programs.

The embodiments described herein would facilitate access to the funds the government gives to the third party intermediaries. The funds in the third party intermediaries' account would be transferred directly to the service provider once government approved services had been rendered.

Also, in any of the discussed methods, the smart card is contemplated to be used for more than one government benefits program or retirement agency program.

While the foregoing is directed to the preferred embodiments of the present invention, other and further embodiments of the invention can be devised without departing from the basic scope thereof, and the scope thereof is determined by the claims that follow.

What is claimed is:

1. A method for registering a person with a government program to eliminate fraud consisting of:
   a. registering an entity with a first government entity forming an authorizing entity;
   b. registering a first person with a first government entity at the authorizing entity having a government program and issuing an individual identification code (IIC) to the first person;
   c. entering the individual identification code (IIC) into an electronic retrieval system;
   d. obtaining first data at a first point in time on the first person and linking the first data to the individual identification code (IIC), wherein the first data comprises at least one of a member selected from the group consisting of first biometric data, a first personal identification code (PIN1), a first electronic signature, personal data and combinations thereof;
   e. using a smart card to facilitate communication with the electronic retrieval system;
   f. reading second data at a second point in time, wherein the second data comprises at least one member selected from the group consisting of second biometric data, a second personal identification code (PIN2), a second electronic signature, second personal data and combinations thereof, of a second person, wherein the second point of time is later than the point of time;
   g. comparing the second data with the first data to form compared data;
   h. determining from the compared data whether the second person is the first person to obtain a verified identity;
   i. sending a first transmission of the verified identity to the first government entity using the smart card at the authorizing entity, wherein the first transmission comprises:
      i. the individual identification code (IIC); and
      ii. a first query for the first data on the first person;
   j. receiving by the first government entity the first data requested in the first query;
   k. sending a second transmission from the first government entity providing the first data requested in the first query to the smart card at the authorizing entity; and l. sending a third transmission providing updated data to the first government entity from the authorizing entity using the smart card.

2. The method of claim 1 further comprising obtaining as first data a photographic image of the first person and linking the photographic image to the individual identification code (IIC).

3. The method of claim 1 further comprising making a second query to a second government entity in the first transmission, wherein the second government entity is selected from the group consisting of a U.S Passport agency, immigration and Naturalization Service, Internal Revenue Service, state driver's licensure agencies, state parks, federal parks, federal monuments, voter registration bureaus, social security agencies, military agencies, professional licensure agencies, police departments, drug enforcement agencies, secondary education institutions, state and federal human service agencies and combinations thereof.

4. The method of claim 1, wherein the first data further includes data selected from the group consisting of:
 a. personal name;
 b. personal address;
 c. personal phone number;
 d. government issued numbers;
 e. personal social security number;
 f. government security clearance codes;
 g. government issued status;
 h. military status;
 i. citizenship information;
 j. passport number;
 k. racial background;
 l. country of origin;
 m. voluntary emergency contact person name;
 n. voluntary health information;
 o. personal date of birth;
 p. personal place of birth;
 q. personal height;
 r. weight;
 s. hair color; and
 t. combinations thereof.

5. The method of claim 1, wherein the first data further comprises, voluntary health information, and wherein the voluntary health information is selected from the group consisting of diabetic information, allergic reactions to drugs, blood type, pre-existing health conditions, required medications and combinations thereof.

6. The method of claim 1, wherein the determining from the compared data whether the second person is the first person comprises matching personal data selected from the group consisting of:
 a. biometrics;
 b. social security number;
 c. personal data;
 d. government issued numbers; and
 e. combinations thereof.

7. The method of claim 1, wherein the second transmission further comprises:
 a. a tracking number for the first transmission;
 b. a statement as to all queries made for the first person.

8. The method of claim 1, wherein the first transmission is facilitated by an authorized entity registered with the first government entity.

9. The method of claim 8, wherein the authorized entity is selected from the group consisting of a police officer, a court, an emergency medical technician, a fireman, a military personnel, a department of public safety officer, a physician, a disaster recovery team member, a hospital worker; an immigration officer, a customs officer, a federal airport security personnel and combinations thereof.

10. The method of claim 1, wherein the first government entity issues the smart card and the smart card comprises information selected from the group consisting of:
 a. personal name;
 b. personal address;
 c. personal phone number;
 d. personal fax number;
 e. personal email address;
 f. personal social security number;
 g. biometrics data;
 h. personal identification code;
 i. electronic signature;
 j. health information;
 k. emergency contact person;
 l. expiration date of the smart card;
 m. government issued numbers;
 n. personal data; and
 o. combinations thereof.

11. The method of claim 10, wherein the information on the smart card is retrieved upon obtaining second biometric data from the second person.

12. The method of claim 10, wherein the information on the smart card is encrypted.

13. The method of claim 10 further comprising the step of disposing marks on the smart card, wherein the marks are selected from the group consisting of government entity trademarks and logos, third party trademarks and logos, and combinations thereof.

14. The method of claim 10, wherein the smart is used for more than one government entity.

15. The method of claim 14, wherein at least one of the more than one government entity is selected from the group consisting of U.S Passport agency, Immigration and Naturalization Service, Internal Revenue Service, state driver's licensure agencies, state parks, federal parks, federal monuments, voter registration bureaus, social security agencies, military agencies, professional licensure agencies, police departments, drug enforcement agencies, secondary education institutions, state and federal human service agencies and combinations thereof.

16. The method of claim 1, wherein the electronic retrieval system comprises a database wherein the personal data is held for comparison purposes.

17. The method of claim 16, wherein the electronic retrieval system comprises a process selected from the group consisting of an internet query, an e-mail query, a network query, comparative information transfers and combinations thereof.

* * * * *